Feb. 16, 1954    J. T. SHIELDS    2,669,101
DEVICE FOR HEATING AND COOLING VEHICLES
Filed Dec. 31, 1952
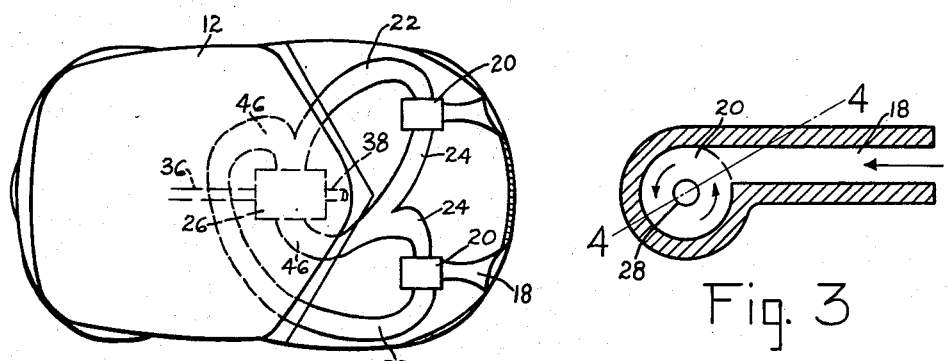
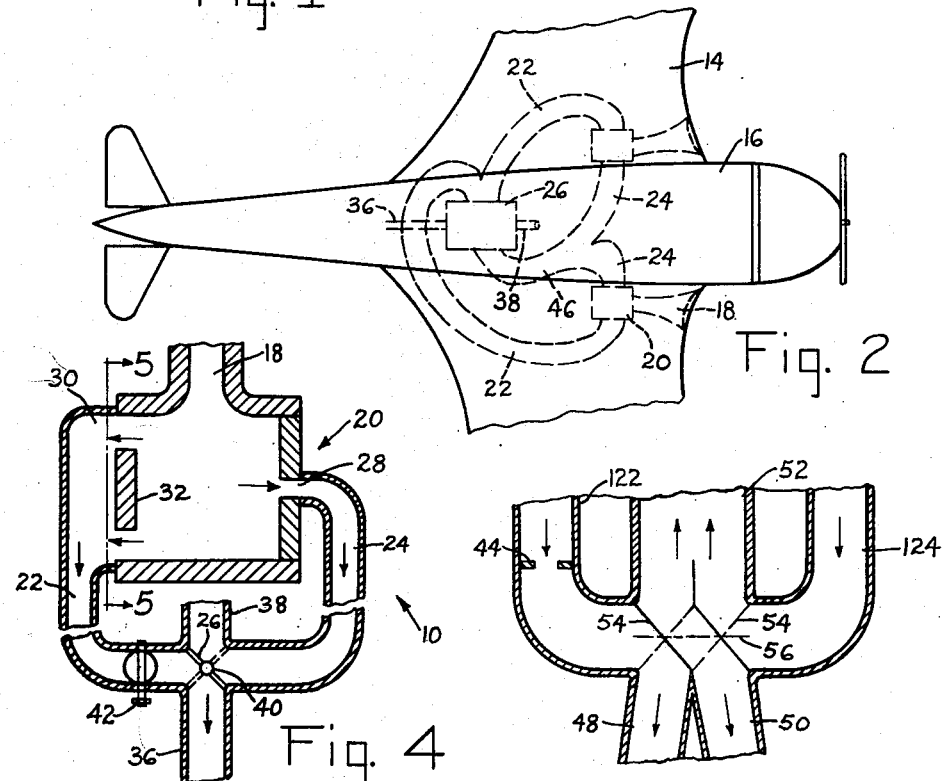
INVENTOR
JAMES T. SHIELDS
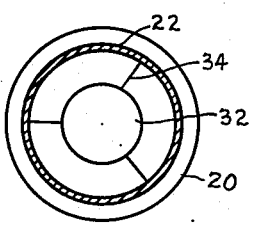
BY
ATTORNEYS Patented Feb. 16, 1954

2,669,101

UNITED STATES PATENT OFFICE 2,669,101

DEVICE FOR HEATING AND COOLING VEHICLES

James T. Shields, Inwood, N. Y.

Application December 31, 1952, Serial No. 329,156

5 Claims. (Cl. 62—136)

(Granted under Title 35, U. S. Code (1952), sec. 266)

The invention described herein may be manufactured and used by or for the Government of the United States of America for governmental purposes without the payment of any royalties thereon or therefor.

The invention relates to a device adapted to selectively heat or cool the interior of a vehicle, as desired.

An object of the invention is to provide a device that will supply heated air or cooled air into a vehicle in order to warm or cool the interior thereof.

Another object of the invention is to provide a device which will operate where air pressure is available.

Yet another object of the invention is to control the temperature of the air by varying the amount taken into the vehicle.

A specific object of the invention is to divide the heated air from the cold air and feed either one into the vehicle, as desired.

Still another object of the invention is to provide selective control means for heated or cool air.

And still another object of the invention is to provide auxiliary means to supply the necessary air where the speed of the vehicle is insufficient to do so.

And yet another object of the invention resides in the provision of a device that is capable of being readily installed in various types of vehicles without necessitating considerable modification of existing structure in the vehicles.

It is a purpose of the invention to devise a structure that is relatively inexpensive to manufacture, is readily installed by the average mechanic and is durable and satisfactory for the intended purpose.

Other objects and many of the attendant advantages of this invention will be readily appreciated as the same becomes better understood by reference to the following detailed description when considered in connection with the accompanying drawings wherein:

Figure 1 represents the device of the invention as installed in an automobile;

Figure 2 illustrates the invention adapted for use in an airplane;

Figure 3 is a longitudinal sectional view of the vortex tube used;

Figure 4 is a section taken on line 4—4 of Figure 3 and illustrates a single structural unit of the invention;

Figure 5 is a vertical section taken on line 5—5 of Figure 4; and

Figure 6 illustrates an alternate form of air supply control.

The invention is so designed that the heated air or cold air employed to heat or cool the interior of the vehicle is supplied from the atmosphere when the vehicle is in motion. The atmospheric air rushing by is subjected to compressive action with the component parts resulting from such action being selectively supplied to the vehicle.

The specific heating, cooling and control unit of the invention is generally designated as 10 in Figure 4 and is adapted to be readily installed beneath the hood of an automobile or similar vehicle 12, as illustrated in Figure 1, or in the wings 14 of an airplane 16. Obviously the position of the unit of the invention is not limited to the illustrated construction, since equally effective results can be obtained by other installations. For example, the device could be installed beneath the framework of a vehicle, or in other parts of an airplane. The temperature control device 10 comprises a ram pressure air intake means, such as tube 18, cylindrical pressure chamber or vortex tube 20, hot and cold conduits 22 and 24 and air by-pass control valve 26.

Figures 3 and 4 illustrate most clearly the cylindrical pressure chamber and conduit means whereby the hot and cold air are supplied to the interior of the vehicle. The pressure chamber 20 is in the form of a vortex tube, or any desired similar construction. Intake tube or pipe 18 terminates in the upper portion of cylindrical chamber 20 in a position tangential to the chamber.

The operation of cylindrical chamber 20 is based on the fact that air, supplied from tube 18, enters the chamber at a point tangential thereto. Due to the velocity of the incoming air, a rotation of the air stream takes place in the chamber, in a path of circular cross-section. This rotating air stream compresses the air adjacent the wall inside the cylinder, the further away such air being from axis of the cylinder, the higher the compression (and therefore the temperature). The air nearest the axis of the cylinder is at the least pressure and is coolest at that point. The air is thus separated by chamber 20 into two streams, one heated by compression and the other cooled by expansion. A temperature differential of more than 100 degrees centigrade may be obtained in this manner.

Axial orifice outlets 28 and 30 are provided at each end of the chamber with orifice 28 of considerably smaller diameter than orifice 30. The cold air, being nearest the axis of cylinder 20, passes out through orifice 28 and into connecting conduit 24. Baffle 32 is retained within outlet 30 and is spaced from the wall surfaces of chamber 20 by means of spiders 34. The heated air thus leaves chamber 20 in the form of an annular stream from a point adjacent the inner wall, where the greatest amount of compression has occurred, and consequently where the stream of air is hottest.

Conduits 22 and 24 carry the air stream selectively to either a common distribution pipe 36 or exhaust pipe 38, depending upon the position of valve 26. Conduits 22 and 24 are of any suitable construction and may be of fabric, metal, etc., as desired. Valve 26 is pivoted at 40 to the full line position shown in Figure 4, for heated air to be supplied to the interior of the vehicle and at the same time to exhaust the cold air to the atmosphere. Reversal of the valve to the dotted line position reverses the flow of cool and heated air, to cool the interior of the vehicle.

An auxiliary control means is provided in the hot air conduit 22 by means of a suitable throttling valve 42. While valve 42 is illustrated as being of the butterfly type, it is understood that other types of control means could be substituted without departing from the basic conception. Thus, for example, a slide valve could be used, or the iris diaphragm type of valve 44, illustrated in Figure 6, could be provided. The temperature in the vehicle can be readily controlled through valve 42. An initial throttling to permit less heated air to flow will give a rise in temperature as the flow is decreased. Continued throttling, however, will cause the temperature of the heated air to fall, due to the heat loss becoming greater than the rate at which heat can be supplied by the compressed air. The cold air temperature remains low as the compressed air flows through conduit 22. Temperature of the air in the cold tube 24 falls as flow in this conduit is decreased (by allowing a greater air flow through the hot conduit 22). Here also, if an air flow is decreased too much, more heat is absorbed from the surroundings than can be compensated by the small flow of cold air, and the temperature rises after passing through a minimum.

Figures 1 and 2 depict the device as operative in an automobile or airplane. Two units are provided for more uniform temperatures in the vehicles and heated air conduits 22 are joined into a common duct 46, prior to entry into valve chamber 26. A multiplicity of such units could be installed in the same manner as shown for the two units. If desired, the common valve control 26, illustrated in Figures 1 and 2 could be modified to provide separate valve control means for each vortex tube unit 20. This would permit selective individual control when used in the vehicle. The number of units required would vary with the size of the vehicle, the volume of air to be heated or cooled, and the degree of heating or cooling desired.

Figure 6 illustrates a modification of the conduit means where the compressed air conduit 122 and expanded air conduit 124 terminate in individual distribution pipes 48 and 50 respectively. A common exhaust pipe 52 is provided. Obviously, pipe 52 could be formed in a manner similar to the distribution pipes, if it were expedient to do so. A double vane valve 54, actuated by a common control shaft 56, can be pivoted simultaneously to supply either hot or cold air to the vehicle. Iris diaphragm 44 provides a temperature control means, as explained above. In this form of construction the points of outlet in the vehicle for the hot and cold air may be at different locations. This allows the air to be dispersed to a greater extent, and allows for positioning of the cold air outlets in locations where cold air drafts would be less objectionable to passengers than would the warm air.

While the invention is designed to employ the built up air pressure, or ram pressure, occurring when the vehicles are in motion, it may sometimes be desirable to employ the device when the vehicles are standing still. In that event, compressed air can be supplied to the tube 18 in any suitable manner. For example, a centrifugal blower can be used to supply compressed air to chamber 20. It would be a simple matter to drive the blower from the crankshaft in front of the vehicle motor, with the output of compressed air connected to the cylindrical chamber input. Obviously, many other similar means could be provided without departing from the scope of the invention.

In the operation of the invention, the vehicle is in motion to provide an air supply in tube 18. This incoming air enters chamber 20 tangentially at the top thereof and the air is rapidly rotated around the wall inside the chamber. It is desirable, for increased efficiency, to make chamber 20 of sufficient length to permit several complete revolutions of the air supply before removal through outlets 28 and 30. In effect, two separate streams of air are now obtained. The outer stream, due to the centrifugal action, is compressed while at the same time, there is a considerable fall in pressure in the central stream. These two streams are readily separated with the compressed or heated air stream removed through annular outlet 30 and the cold air stream removed through axial outlet 28. By use of the throttling valve, some further compression is obtained to raise the temperature of the heated air stream additionally. The position of control valves 40 or 54 determine whether cold or heated air is supplied to the interior of the vehicle.

Obviously many modifications and variations of the present invention are possible in the light of the above teachings. It is therefore to be understood that within the scope of the appended claims the invention may be practiced otherwise than as specifically described.

What is claimed is:

1. In a temperature control device for a vehicle, a cylindrical chamber, an axial outlet in one side of said chamber, a second outlet in the opposite side of said chamber and coaxial with said first outlet, said second named outlet being of greater diameter than the first, baffle means concentric with said second outlet, means on said chamber to supply a stream of air thereto, conduits secured to said outlets, distribution pipe means connected to said conduits, valve means in said conduits pivotally mounted to selectively control flow of air from the conduits to the distribution pipe, and throttling means in one of said conduits to vary the flow of air therethrough.

2. The combination of claim 1 wherein said throttling means comprises a butterfly valve in the heated air conduit.

3. The combination of claim 1 wherein said throttling means comprises an iris diaphragm valve in the heated air conduit.

4. The combination of claim 1 wherein said conduits and said distribution pipe terminate in a single valve chamber and said valve means selectively controls the supply of air to said distribution pipe.

5. The combination of claim 4 wherein said distribution pipe comprises a pair of hot and cold pipe means terminating in said valve chamber, and said valve means is a double vane and includes means to simultaneously pivot said vanes to alternate positions.

JAMES T. SHIELDS.

References Cited in the file of this patent

UNITED STATES PATENTS

| Number | Name | Date |
|---|---|---|
| 1,942,295 | Kerr | Jan. 2, 1934 |
| 1,952,281 | Ranque | Mar. 27, 1934 |
| 2,130,089 | Hull | Sept. 13, 1938 |
| 2,522,787 | Hughes | Sept. 19, 1950 |
| 2,581,168 | Bramley | Jan. 1, 1952 |